April 13, 1965    C. W. WHEELOCK    3,178,356
NUCLEAR REACTOR
Filed Aug. 1, 1961    10 Sheets-Sheet 1

FIG. 1

INVENTOR.
CLIFFORD W. WHEELOCK
BY
ATTORNEY

INVENTOR.
CLIFFORD W. WHEELOCK
BY
J. Frederick Hamann
ATTORNEY

FIG. 2B

April 13, 1965  C. W. WHEELOCK  3,178,356
NUCLEAR REACTOR

Filed Aug. 1, 1961  10 Sheets-Sheet 5

INVENTOR.
CLIFFORD W. WHEELOCK
BY
*S. Fredrick Samann*
ATTORNEY

INVENTOR.
CLIFFORD W. WHEELOCK
ATTORNEY

April 13, 1965  C. W. WHEELOCK  3,178,356
NUCLEAR REACTOR

Filed Aug. 1, 1961  10 Sheets-Sheet 7

INVENTOR.
CLIFFORD W. WHEELOCK

BY

ATTORNEY

FIG. 6

April 13, 1965 C. W. WHEELOCK 3,178,356
NUCLEAR REACTOR

Filed Aug. 1, 1961 10 Sheets-Sheet 9

INVENTOR.
CLIFFORD W. WHEELOCK
BY
ATTORNEY

April 13, 1965 C. W. WHEELOCK 3,178,356
NUCLEAR REACTOR
Filed Aug. 1, 1961 10 Sheets-Sheet 10

FIG. 8

INVENTOR.
CLIFFORD W. WHEELOCK
BY
ATTORNEY 3,178,356
NUCLEAR REACTOR
Clifford W. Wheelock, Canoga Park, Calif., assignor, by mesne assignments, to the United States of America as represented by the United States Atomic Energy Commission
Filed Aug. 1, 1961, Ser. No. 128,430
12 Claims. (Cl. 176—33)

The present invention is directed to nuclear reactors and more particularly to organic and other liquid moderated and cooled reactors for the production of power.

The advantages of organic moderated and cooled reactors are well established, e.g., low vapor pressure, small radiolytic damage, compatibility with carbon steels and aluminum alloys, absence of chemical reactions with reactor materials, and good moderating properties. However, such reactors generally have low specific power, thereby materially increasing fissionable material inventory and reactor cost. Other disadvantages of the organic cooled and moderated reactor include high power peaking in the fuel elements, large control rod requirements because of low conversion ratio, and high reactivity loss rates.

It is therefore the primary object of the present invention to provide an improved organic moderated and cooled nuclear reactor.

A further object of the present invention is to provide an organic moderated and cooled nuclear reactor having an increased power density and low fuel costs.

Another object of the present invention is to provide an improved fuel element and core structure.

Another object of the present invention is to provide a simplified control rod arrangement in the core.

Another object of the present invention is to eliminate axial load bearing grids within the reactor vessel and to support the core upon the bottom head of the reactor vessel.

Another object of the present invention is to provide a simplified fuel element and fuel element supporting arrangement in which differential axial expansion of the core components is accommodated.

A still further object of the present invention is to provide for improved accessibility to the core volume for instrumentation.

A further object of the present invention is to provide a modular fuel element and fuel assembly.

These and other objects and advantages of the present invention will be more apparent from the following detailed description and drawings, made a part hereof, in which:

Figure 1:
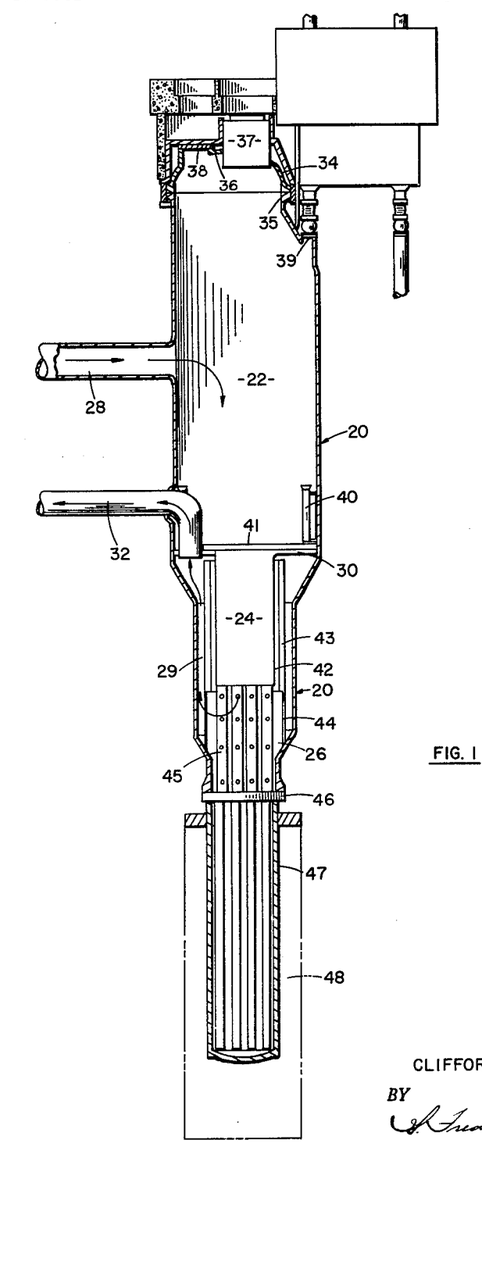
FIGURE 1 is a partially schematic section of the reactor complex.

Referring now to the drawings in detail, FIG. 1 shows the reactor vessel 20 and the relative location and orientation of the core and the coolant flow. Specifically, the reactor vessel, indicated generally at 20, consists of an upper coolant inlet plenum 22, a core region 24, and a lower coolant outlet plenum 26. A coolant inlet 28 is connected from a heat utilizing system, not shown, to the inlet plenum 22. The coolant, preferably organic, is directed through the core region 24 by a flow baffle 30 into the lower plenum 26. The heated coolant flows upwardly along the outside of the core region in channel 29 and is directed by the baffle 30 to two coolant outlets 32. The vessel has a head 34 sealed to the top flange 35 having two ports, one port 36 for the fuel manipulator 37 and an emergency access port 38. Also provided in the upper portion of the vessel 20 is a fuel element removal port 39.

Figure 2:
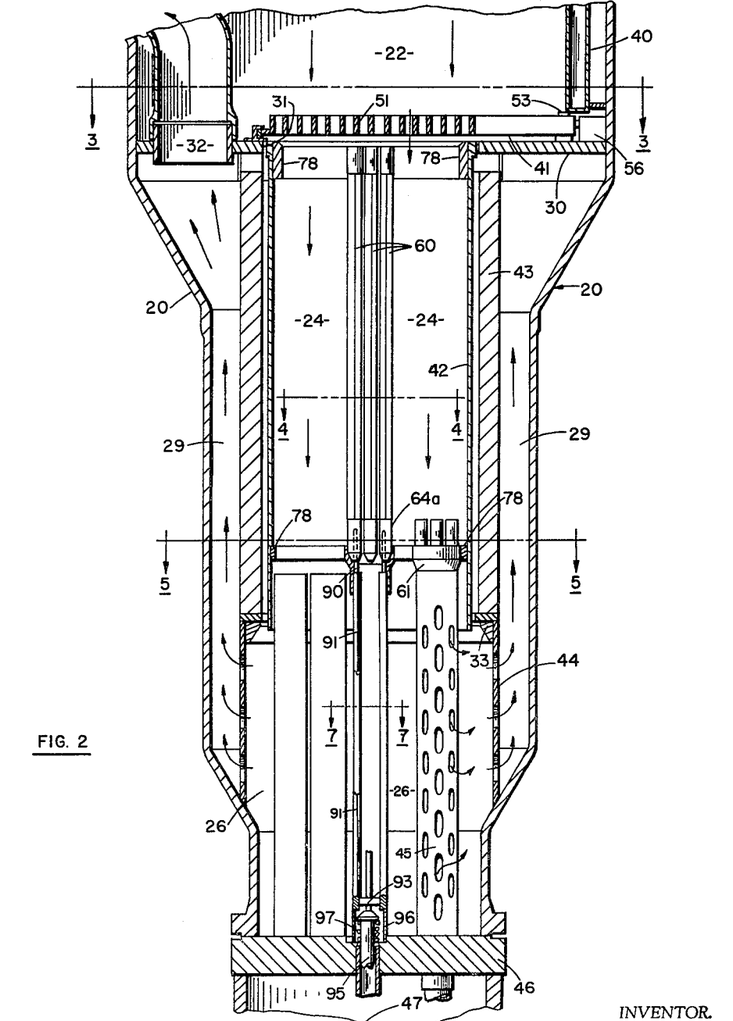
FIGURE 2 is a sectional view of the reactor core area of FIG. 1.

A plurality of fuel element storage tubes 40 are provided in the upper plenum 22 along the inner periphery of the vessel 20. The fuel storage rack is attached to the inner periphery of the reactor vessel above and outside the reactor core. A capacity for forty elements is provided, thereby allowing for storage of new fuel as well as spent fuel during the decay heat removal period. The baffle 30 supports a removable upper custody grid 41, described in detail hereinafter, and a core flow-directing baffle 42. Spaced from and surrounding baffle 42 is a thermal shield 43 supported upon a perforated support barrel 44. The thermal shield 43 is fabricated from thick steel and the heat generated therein during reactor operation is transferred to the coolant flowing in the two annuli between the core baffle 42 and the wall of the reactor vessel 20. The baffle 42 is removably supported within the aperture 31 of the horizontal flow baffle 30 by lugs 33 (see FIG. 2) on the thermal shield 43. The upper outer periphery of baffle 42 is designed to substantially eliminate any coolant flow from the inlet plenum 22 to the outlet channel 29.

A plurality of perforated support columns 45, to which fuel elements are connected as described hereinafter, are removably connected to the bottom head 46. The bottom head 46 has a plurality of apertures (see FIG. 2A) through which the control rod drives are connected. A control rod drive chamber 47 is suspended from the bottom of plate 46 and extends downwardly into the sub-pile room 48. The support columns 45 are preferably fabricated with sectional grid plates 61 integrally connected to the top of the columns 45. A grid plate 61 of this embodiment is shown in detail in FIG. 6 and consists of a lower cylindrical portion 62 connected to a column 45 and an upper fuel element receiving portion 63. The upper portion 63 has a locating plate 64 having at least one aperture in which a fuel element receiving socket sleeve or supporting member 64a is connected. The grid plates 61 and sleeves 64a support the fuel elements 60.

Figure 2A:
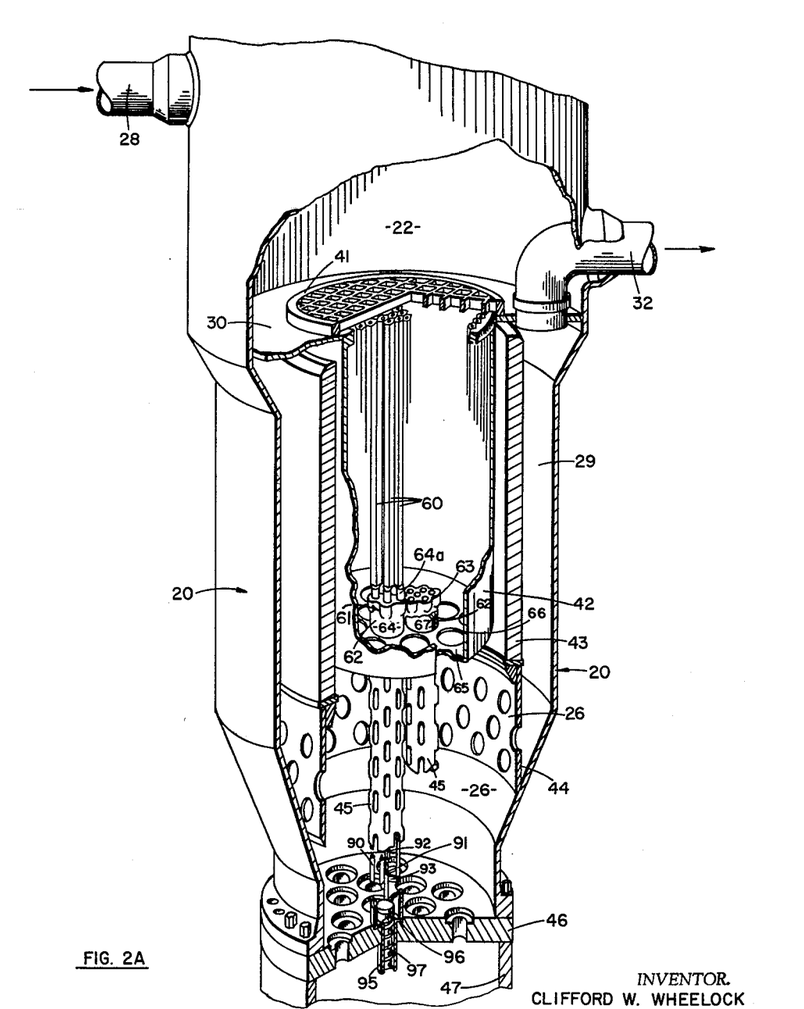
FIGURE 2A is a partially sectioned perspective view of a modified portion of FIG. 2.

FIG. 2A shows a modified sectional grid arrangement in which the core baffle 42 is provided with a lower flow seal grid plate 65 having a plurality of apertures 66 through which the support columns 45 extend in close fitting arrangement. In this modification the sectional grid plates 61 are separate units and fit over the upper ends 67 of columns 45. The upper ends 67 and the walls of apertures 66 prevent coolant flow through aperture 66. In this manner the lower support plate 78 (see FIG. 2) described hereinafter may be eliminated and lateral support of each column 45 and fuel element 60 is individually provided by the grid plate 65, whereas in the embodiment of FIG. 2 each sectional grid plate 61 is supported laterally by the adjacent sectional grid plates 61. In both embodiments the sectional grid plates 61 are supported axially by the columns 45, so that the weight of the fuel elements 60 are supported solely by columns 45 and bottom head 46.

Figure 2B:
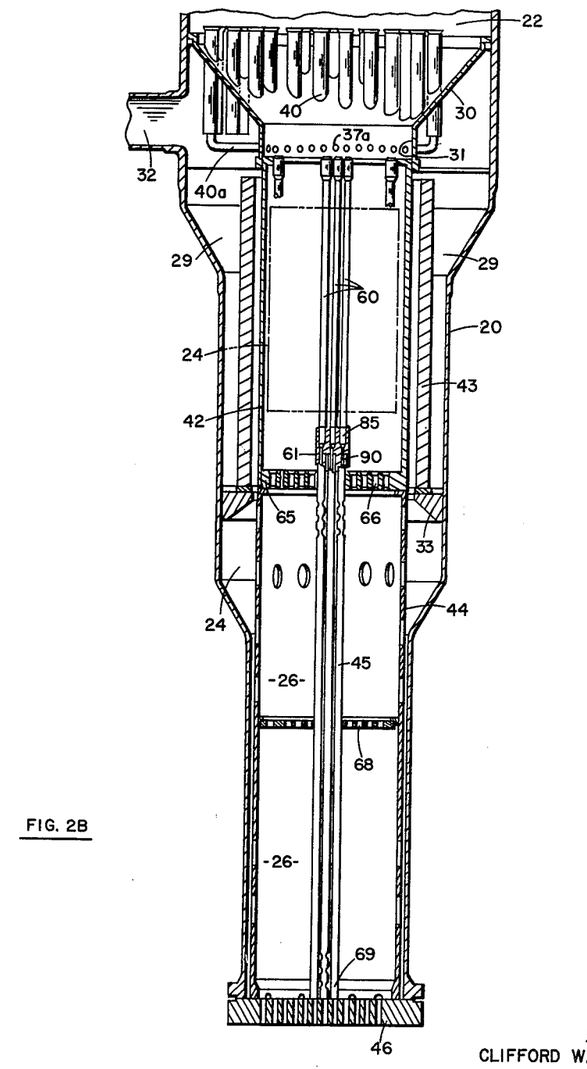
FIGURE 2B is a sectional view of a second modification of FIG. 2.

FIG. 2B shows a second modification of the sectional grid 61 and support column 45 arrangement. In this embodiment the flow baffle 30 is conical in form and has a cylindrical circular opening 31 at its lower end. A plurality of fuel element storage tubes 40 are integrally supported in the conical surface and are provided with coolant flow pipes 40a connecting the bottom of tubes 40 with a plurality of apertures 37a in the cylindrical opening 31. In this manner coolant flow over the stored fuel elements is maintained. In this embodiment the custody grid 41 is omitted.

The thermal shield 43 is supported by the wall of vessel 20 in this embodiment and the flow-directing baffle 42 is supported on a perforated support barrel 44, which extends downwardly to the bottom head 46. The flow control grid plate 65 provides radial support only for the support columns 45. A lower radial guide grid plate 68 may also be provided intermediate the upper grid plate 65 and bottom head 46. In this embodiment a support column 45 is provided for each fuel element 60, each column 45 having an individual sectional fuel element receiving grid plate 61 at the upper end of column 45 which is also the housing for the control rod drive. The sectional grids 61 are shown as being integral with the upper end 67 of columns 45 in this embodiment, although they may be removable as shown in the embodiment of FIG. 2A, if desired. Each column 45 and associated fuel element 60 may be provided with a control rod 90 maintained in axial alignment by control rod guides 89 (see FIG. 2C). The columns 45 are preferably provided with perforations at the upper end 67 and/or the lower end 69 so that coolant flow is maintained through the plenum 26 to prevent settling of particles on the bottom head 46 and to maintain the temperature constant along the length of columns 45.

Figures 2C, 3:
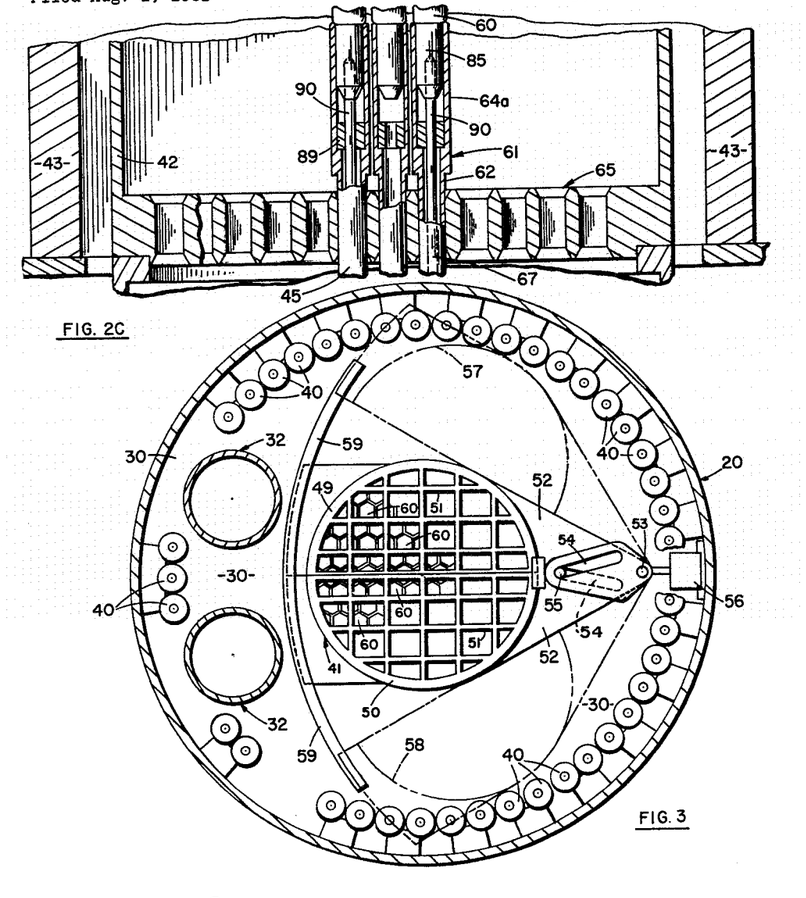
FIGURE 2C is a detail sectional view of the flow seal grid plate of FIG. 2B.
FIGURE 3 is a sectional view along line 3—3 of FIG. 2.

FIG. 3 shows a cross-sectional view of the vessel 20 and shows the custody grid 41 (in closed position) which is fabricated in two sections 49 and 50, each section having an open grid network 51 and a support member 52. The support members 52 are rotatably mounted on a pivot 53 and have angular slots 54 in which a pin 55 is freely slidable. As the pin 55 is moved outwardly by drive mechanism 56, the two sections 49 and 50 are moved into positions 57 and 58, shown in phantom. The sections are pivoted about pivot 53 in a plane defined by grid guides 59 to expose the fuel elements 60. The grid network 51 is such that fuel elements 60 are prevented from removal unless the grid sections 49 and 50 are rotated into positions 57 and 58. The custody grid sections prevent the fuel elements from moving out of their normal position in the core in the event there is any binding of the control rods in the control rod tubes of each fuel element. These grid sections are mounted on the flow splitter baffle 30, which is a circular plate with a concentric circular opening 31 (see FIG. 2) for the core and coolant outlet openings for outlets 32.

Figures 4, 4A:
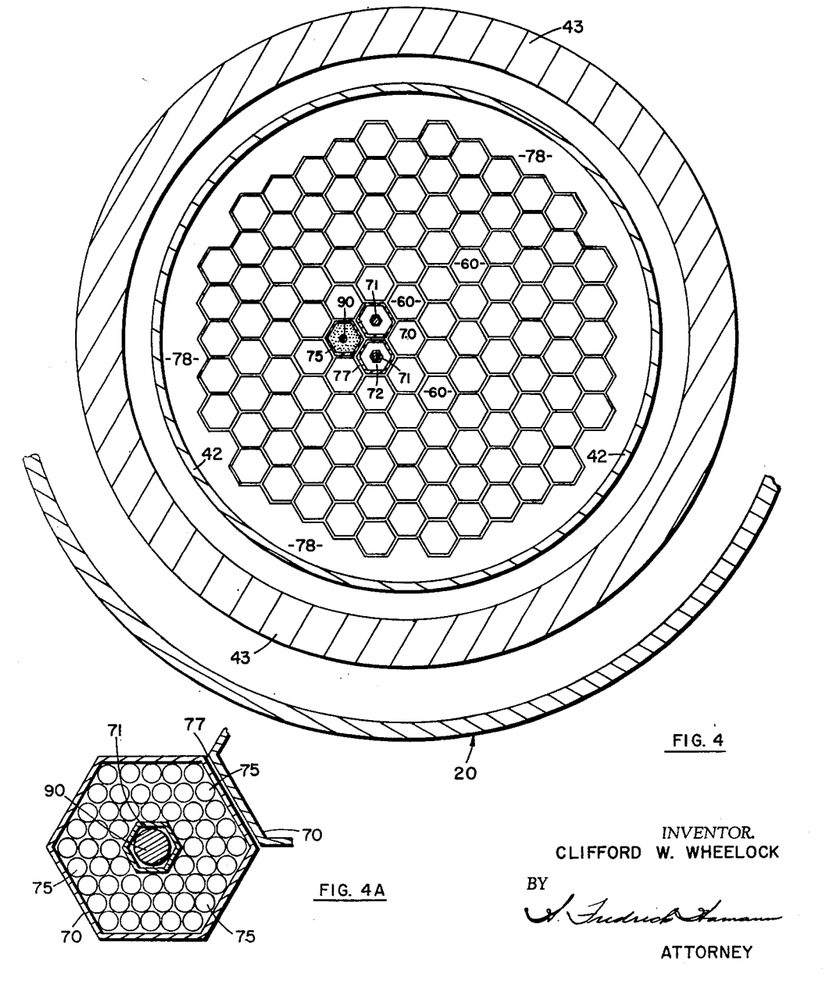
FIGURE 4 is a sectional view along line 4—4 of FIG. 2.
FIGURE 4A is a detail of a portion of FIG. 4.

FIG. 4 is a cross-sectional view of the core showing the array of fuel elements 60, each having a hexagonal outer shell 70 and an inner control rod guide tube 71. The primary coolant flow channel or volume 72 between the outer shell 70 and the guide tube 71 contains 54 fuel pins 75 (see FIG. 4A). Each face of the hexagonal shell 70 is spaced from the adjacent face of the other fuel elements 60 by an annular volume 77. In this manner, a controlled coolant flow is maintained through the core outside of the volume 72. The outer periphery of the core has a matching fuel element support plate 78 connected to the core baffle 42 at both the bottom and top of the baffle 42. With a single-pass system and the coolant flow in the downward direction through the core, approximately 95 percent of the flow is through the fuel elements with the remaining 5 percent flowing along the outside of the hexagonal shells 70 and in the guide tubes 71.

Figure 5:
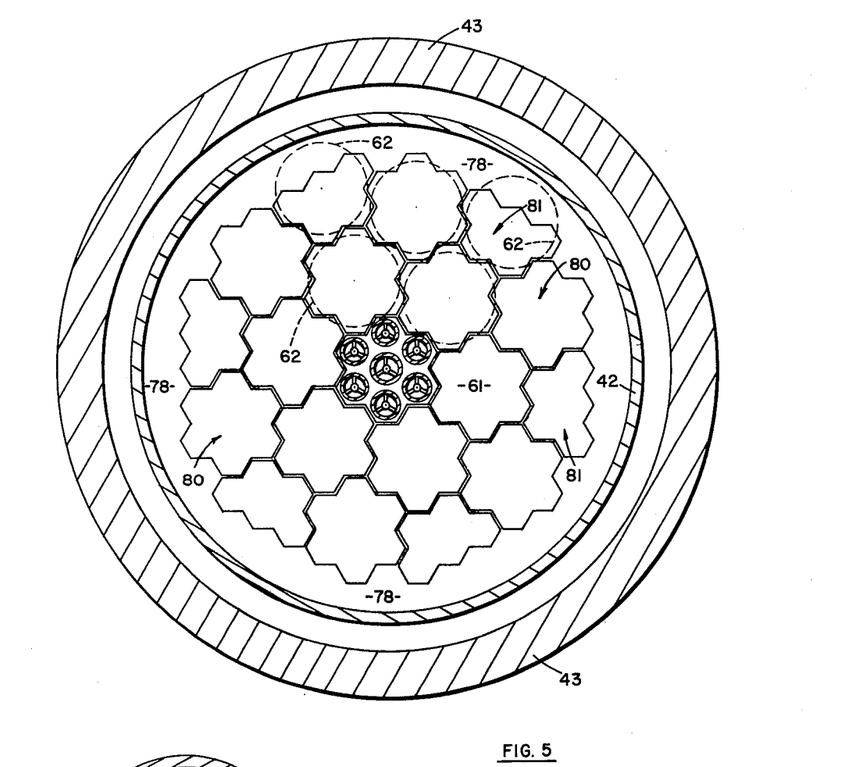
FIGURE 5 is a sectional view along line 5—5 of FIG. 2.
Figure 6:
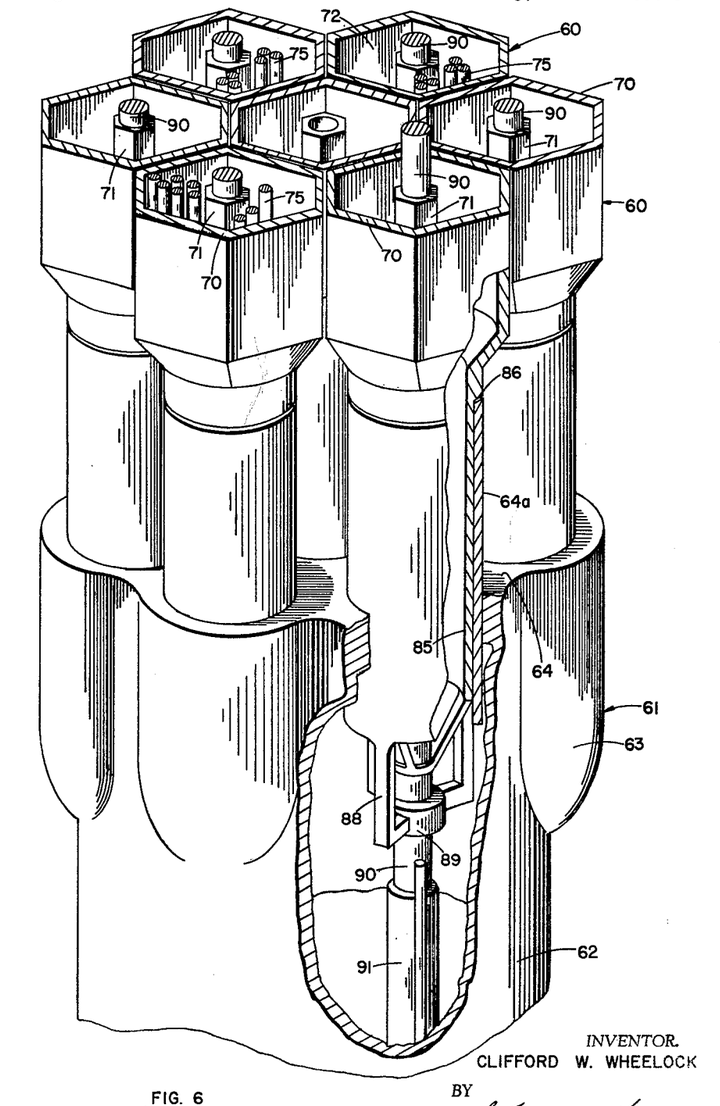
FIGURE 6 is a partially sectioned perspective view of the sectional grid plate.

FIG. 5 shows a sectional view of the core 24 showing the arrangement of the sectional grid plates 61. The core consists of thirteen groups of seven elements each indicated as 80, and six groups of five elements each indicated at 81. The seven-element groups are centrally located in the core, while the five-element groups are spaced around the periphery. Each fuel element of each group is independently removable from the associated sectional grid plate 61. No latching devices are required for the elements, since the direction of coolant flow is down through the core. A more detailed view of the relationship of the fuel elements 60 and sectional grid plate 61 is shown in FIG. 6.

Figure 5A:
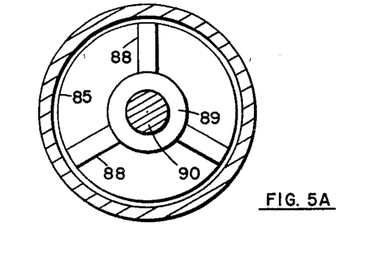
FIGURE 5A is a detail of a portion of FIG. 5.

The fuel element 60 has a cylindrical bottom end fitting 85, having a shoulder 86, which is supported in the fuel element receiving socket sleeve 64a, having its upper end in supporting engagement with shoulder 86. While seven such sleeves have been shown, each fuel element may be provided with an individual grid 61 and and sleeve 64a, as shown in FIG. 2B. The sleeve 64a is welded to the locating plate 64 of the sectional grid plate 61. In this manner the vertical alignment of the fuel elements is maintained by sleeves 64a. The sleeve 64a has a plurality of extensions 88 terminating in a control rod guide 89 through which the control rod 90 is freely slidable (see FIG. 5A). A control rod guide tube 91 supported by the support columns 45 extends upwardly within the removable sectional grid plate 61 and terminates below the control rod guide 89. Each fuel element 60 has a plurality of fuel pins 75, an inner control rod guide tube 71, and a hexagonal outer shell 70.

Figure 7:
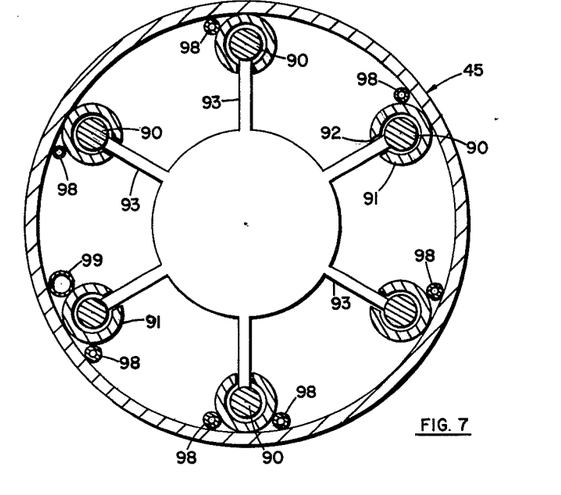
FIGURE 7 is a sectional view along line 7—7 of FIG. 2.

The support columns 45 are shown in FIGS. 7 and 2A and have a plurality of slotted control rod guide tubes 91 integrally attached to the inner surface. In the embodiment of FIGS. 2B and 2C a plurality of control rod guides 89 spaced along the tube 45 may be provided for the single control rod. Each slot 92 is arranged facing the center of the tube 45 so that a spider 93 may be connected to the control rod 90 which is freely slidable in each of the guide tubes 91. The spider 93 is driven longitudinally in the support tube 45 by a control rod drive 95 preferably located in the control rod drive chamber 47 (see FIG. 2). However, it is within the purview of this invention to locate the control rod drive units within the tube 45.

The tube 45 passes through the bottom plate and has a shoulder 96 which is supported by the bottom plate 46. In this manner, the bottom plate 46, which supports the entire weight of the core, is removed from the high flux and high temperature region adjacent the core. The control rod drive 95 has a spring loaded insertion or scram mechanism 97 which is released from a compressed position upon scram and drives all the control rods upwardly into the core 24. Each control rod guide tube 91 (see FIG. 7) and each fuel element 60 may be provided with an associated failed fuel element and outlet temperature monitoring tube 98. One flux monitoring tube 99 is also provided for each group 80 or 81.

Figure 8:
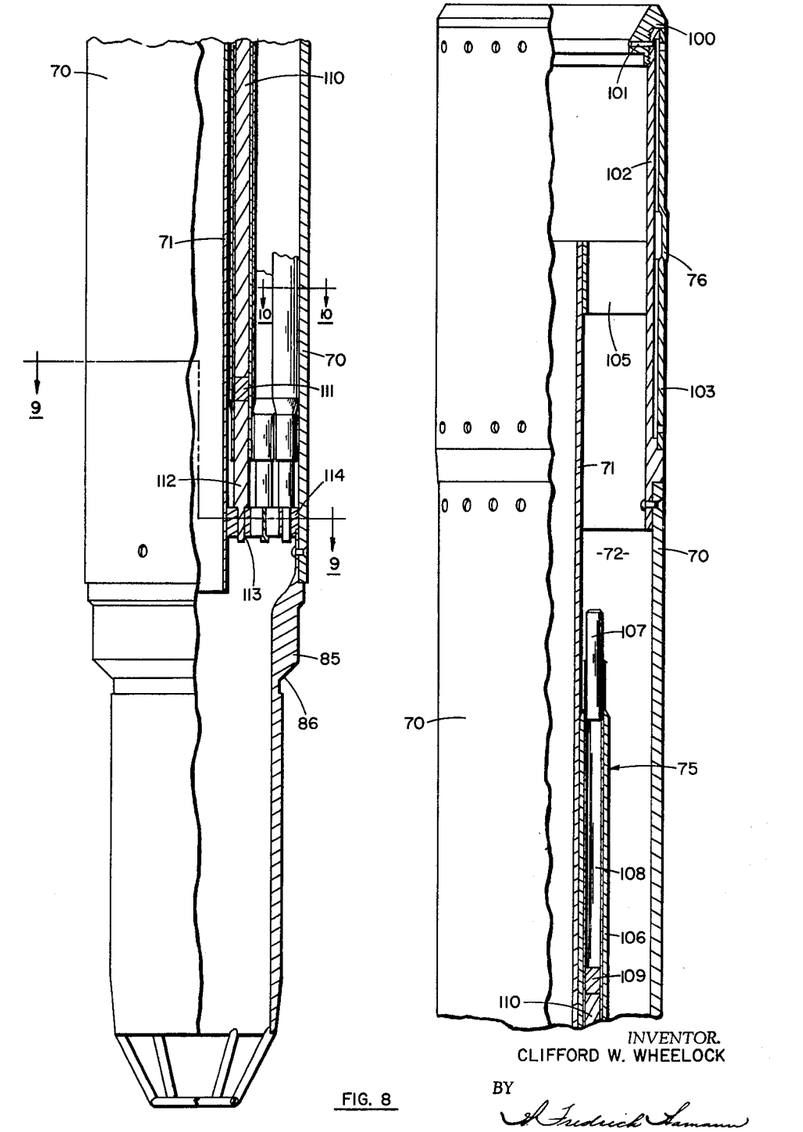
FIGURE 8 is a partially sectioned view of the fuel element of the present invention.

The fuel complement consists in the preferred embodiment of thirteen groups 80 of seven elements and six groups 81 of five elements, although this number may be varied depending upon the size of the reactor. The seven-element groups 80 are centrally located in the core, while the five-element groups 81 are spaced around the periphery to approximate a circle. The elements 60 are supported at the bottom only and are arranged in a triangular pattern on 4.75 in. centers. Each fuel element of all the groups is identical in construction and as shown in FIG. 8 consists of a hexagonally shaped cap 100, having a central grapple receiving aperture 101, supported on a head member 102 which is integrally attached to the top of the hexagonal outer shell 70, and an end fitting 85 connected to the bottom of the shell 70. The head member 102 preferably has a flexible biasing member 103 on its outer periphery and each side of the biasing member 103 has a contact face or lug 76 which contacts the face 76 of the adjacent fuel element 60 of the group and provides the correct lattice spacing when positioned within the core. Within the head member 102 is a spider support 105 which engages and supports the control rod guide tube 71 in a central axial position within the fuel element 60.

The volume 72 between hexagonal outer shell 70 and the hexagonal inner control rod guide tube 71 contains fifty-four fuel pins 75. Each pin 75 consists of a finned walled APM tube 106 having a top plug 107, a spring (not shown), and inert gas space 108, a ceramic spacer 109, and a plurality of fissionable-material-containing pellets 110, e.g., $UO_2$, UC, $UO_2$—ThO. Other cladding materials may be used and the fuel may be in the form of metal rods also. These pellets 110 are supported on a lower ceramic spacer 111 by a bottom plug 112 integrally sealing the tube 106. The bottom plug 112 has a reduced diameter extension 113 which extends into an aperture in the fuel pin retainer plate 114.

Figure 9:
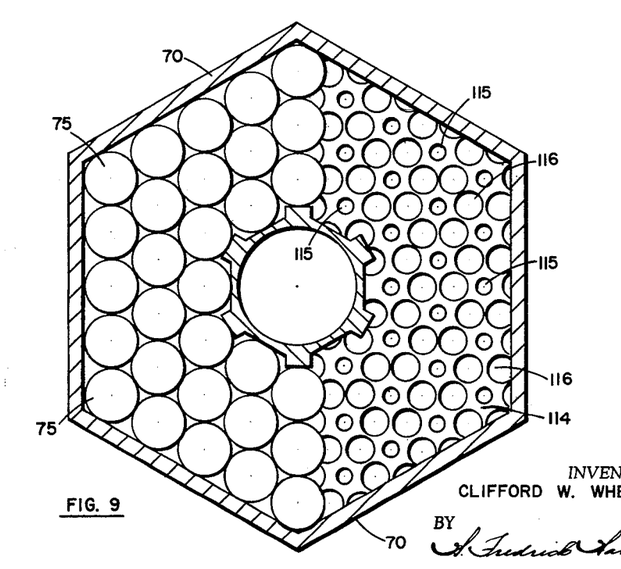
FIGURE 9 is a sectional view along line 9—9 of FIG. 8.
Figure 10:
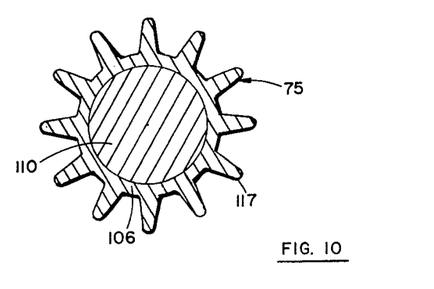
FIGURE 10 is a sectional view along line 10—10 of FIG. 8.

The retainer plate 114 is rigidly supported by the outer shell 70 and is located at the lower extremity of the shell 70. The retainer plate 114 (see FIG. 9) has a plurality of fuel pin apertures 115 in a triangular array, each aperture 115 being surrounded by a plurality of coolant flow holes 116. In this manner the fuel pins 75 are axially supported at their lower end only and lateral support is attained through contact of the helical fins with those of adjacent fuel pins and with the outer shell 70 and control rod guide tube 71. The interstices between the fuel pins are the primary coolant flow channel through the core. The end fitting 85 is supported in the socket sleeves 64a as is shown in FIG. 6. The head member 102 and end fitting 85 are preferably fabricated from stainless steel. The outer shell 70, guide tube 71, and finned tube 106 are fabricated from APM, e.g., by extruding a sintered alloy of finely powdered aluminum and aluminum oxide. The APM is compatible with $UO_2$ and the organic coolant and has desirably low neutron absorption characteristics. The finned tube 106 of the preferred embodiment (see FIG. 10) has twelve fins 117 each 0.093 in. high on a helical pitch of one turn in 48 in., i.e., two turns along the active fuel length.

The organic coolant is preferably a mixture of about 10 percent by weight ortho-terphenyl, 60 percent meta-terphenyl, and 30 percent para-terphenyl. Normal coolant also contains about 30 percent of the decomposition products obtained when the coolant is irradiated. Such a coolant has a low vapor pressure at maximum operating temperatures and the radiolytic damage rate is small. Further, the corrosion rate on the materials specified at the preferred operating temperature is low and there is no chemical reaction hazard with the fuel, APM cladding, or water. The characteristics of the reactor of the preferred embodiment of the present invention with such a moderator and coolant are shown in Table I.

TABLE I

| | |
|---|---|
| Thermal power (Mwt.) | 160 |
| Coolant inlet temperature (° F.) | 644 |
| Coolant outlet temperature (° F.) | 700 |
| Total coolant flow (lb./hr.) | $18 \times 10^6$ |
| Fuel channel maximum velocity (ft./sec.) | 20 |
| Active core height (ft.) | 8.0 |
| Active core diameter (ft.) | 4.56 |
| Design maximum cladding surface temperature (° F.) | 850 |
| Number of fuel elements | 121 |
| Number of control safety rod drives | 13 |
| Number of control safety rods | 78 |
| Total core loading (kg. $UO_2$) | 7550 |
| Total core loading (kg. U) | 6640 |
| Average specific power (kg./kg. U) | 24.1 |
| Core power density (kg./liter) | 43.0 |
| Feed fuel enrichment (a/o) | 3.0 |
| Steam and turbine generator: | |
| Gross electrical output (Mwe.) | 56.0 |
| Net electrical output (Mwe.) | 51.3 |
| Steam pressure at turbine (p.s.i.g.) | 1000 |
| Steam temperature at turbine (° F.) | 675 |
| Feedwater temperature (° F.) | 400 |
| Total steam flow at turbine throttle (lb./hr.) | 587,000 |
| Net plant efficiency (percent) | 32.1 |
| Thermal and flow data for core: | |
| Core pressure drop (p.s.i.) | 38 |
| Fractions of total flow that bypasses the fuel elements | 0.05 |

The core arrangement of the preferred embodiment provides for safe operation, high power density, and low fuel costs, since the small diameter fuel pins, 0.538 O.D., including extended surface cladding, give high specific power and strong undermoderation which results in a large negative temperature coefficient of reactivity, a large conversion ratio, and slow rate of loss of reactivity. This in turn minimizes control rod requirements and reduces fuel costs. The closely packed core arrangement increase volumetric power density, reduces fuel element power peaking, and reduces organic damage rate. The cell volume fractions based upon hot operating conditions and the absence of the control rods is as follows.

TABLE II

Cell volume fractions

| Material: | Volume fraction |
|---|---|
| $UO_2$ fuel | 0.1954 |
| APM clad and fins | 0.1318 |
| Coolant, organic | 0.4146 |
| APM boxes | 0.1465 |
| Noncoolant, organic | 0.1117 |

The nuclear characteristics for the preferred embodiment are as follows, based upon an enrichment of 2.5 percent in the central one-half of the two region core and the balance of the core enriched to a nominal 3 percent as required for the initial core loading:

TABLE III

| | |
|---|---|
| $k_{effective}$ for the initial core | 1.125. |
| $\phi$ thermal | $3 \times 10^{13}$. |
| Equilibrium core average exposure | 9,000 Mwd./MTU. |
| Fuel element average discharge exposure | 17,500 Mwd./MTU. |
| Plutonium concentration in a discharged fuel element | 8.32 gm. Pu per kg. U. |

The control rods 90 are preferably ganged together in groups of six, with each group controlled by a single drive, for movement within six fuel elements in a circle surrounding the seventh unrodded fuel elements. The five-element groups have no control rods. Thus in the preferred embodiment there are fewer control rods per group than fuel elements in the group. However, where each fuel element has an individual grid and column 45, control rods may be provided for all elements. There are thirteen control rod drives and seventy-eight fuel elements for which control rods are inserted. Each control rod consists of a 1 in. O.D. cylinder of $B_4C$ clad with a 0.09 in. thick steel jacket. With this arrangement of the control rods the tube 71 of the central element 69 of each group 81 may be used for flux monitoring or other experimental operations. In the present fuel element support column arrangement access to the center of each fuel element through the flux monitoring tube 99 is a simple matter.

It is thus apparent that the present invention provides a simplifier reactor core and fuel element arrangement, since the core is aligned and mounted from a single bottom head flange, thereby minimizing fabrication costs. The top grid plate is eliminated, thereby reducing costs and removing neutron absorbing material from around the core area. The subassemblies upon which the fuel elements are mounted and which become radioactive are removable and replaceable units. Replacement and repair of auxiliary hardware such as control rod assemblies, temperature monitoring units, neutron flux monitoring channels, and coolant sampling lines is greatly facilitated. Further, the uniform distribution of control by the use of many control rods of a simple form facilitates power distribution control and the number of control rod drives is minimized by the ganged control rod arrangement of the preferred embodiment.

Although a particular embodiment of the present invention has been described, various modifications will be apparent to those skilled in the art. Therefore, the present invention is not limited to the specific embodiments disclosed, but only by the appended claims.

We claim:

1. A nuclear reactor comprising a vessel, said vessel having a bottom head; a plurality of longitudinally extending coolant flow duct means connected to and supported on said head, each of said ducts being connected to and supporting a sectional grid; a plurality of fuel elements; each of said grids having means for supporting at least one fuel element along an axis; means for passing a coolant through said fuel elements, sectional grid and coolant flow ducts; at least one control rod in said duct means; and means for moving said control rod parallel to said axis and longitudinally into said fuel element.

2. A nuclear reactor in accordance with claim 1 wherein said duct is removably connected to said bottom head.

3. In a nuclear reactor, a fuel element support assembly comprising in combination with a plurality of fuel elements having coolant flow channels therethrough, a plurality of sectional grids, said grids being connected at one end to the bottom end of said fuel elements, each of said grids having a coolant flow channel communicating with said fuel element coolant flow channel, each of said grids supporting at least one fuel element, means for supporting said grids in parallel relationship including a plurality of hollow members each having one end connected to the other end of one of said grids, said hollow member defining a coolant flow duct communicating with said grid coolant flow channel.

4. In a nuclear reactor the combination of a core, a coolant inlet plenum at one end of said core, and a coolant outlet plenum at the other end, said core containing a plurality of fissionable-material-containing fuel elements located between said plenums and having coolant flow channels therethrough, a plurality of tubular sectional grids, one end of said grids being removably connected to one end of said fuel elements, each of said grids supporting at least one of said fuel elements, means connected to the other end of each of said grids for supporting said plurality of grids in parallel relationship, said means including a plurality of members each defining a coolant flow channel connecting one of said plenums through said tubular grid with said fuel element coolant flow channels.

5. In a nuclear reactor the combination of a core, a coolant inlet plenum at one end of said core, and a coolant outlet plenum at the other end, said core containing a plurality of fissionable-material-containing fuel elements located between said plenums and having coolant flow channels therethrough, one end of said coolant flow channels communicating with said inlet plenum; a plurality of tubular sectional grids, said grids being removably connected to said fuel elements at the end opposite said one end, each of said grids supporting a group of fuel elements in parallel spaced relationship, means for supporting said grids in parallel spaced relationship including a plurality of hollow members each defining a coolant flow duct connecting said outlet plenum through each of said tubular grids with the coolant flow channels of each of said fuel elements of a group, one end of each of said hollow members engaging one of said grids, and means engaging the other end of each of said members for supporting said member along a vertical axis.

6. In a nuclear reactor the combination of a core, a coolant inlet plenum at one end of said core and a coolant outlet plenum at the other end, said core containing a plurality of fissionable-material-containing fuel elements having coolant flow channels therethrough, one end of said coolant flow channels communicating with said inlet plenum; a plurality of tubular sectional grids, said grids being removably connected to said fuel elements at the end opposite said one end, each of said grids supporting a group of fuel elements in parallel spaced relationship, means for supporting said grids in adjacent parallel relationship, said support means including a plurality of perforated tubes having a coolant flow passage connecting said coolant flow channels of the fuel elements of each of said groups through said tubular grid to said outlet plenum, each of said tubes supporting one of said grids, and reactivity control means within at least one of said tubes and having a plurality of control rods, and means for moving said rods into and out of said core.

7. In a nuclear reactor the combination of a core containing a plurality of fuel elements, each of said fuel elements having a control rod tube and a plurality of fissionable-material-containing fuel pins, a plurality of tubular sectional grids, each of said grids having one end connected to and supporting a group of fuel elements in parallel spaced relation, means for supporting said plurality of grids, said means including a plurality of tubular coolant ducts, each duct being connected to one of said grids, reactivity control means within at least one of said tubular ducts and having a plurality of control rods, means for movably supporting said control rods, said control rods being movable within said control rod tubes of said fuel elements of said group.

8. The combination of claim 7 including a flow seal grid plate and wherein said sectional grids are removably connected to said ducts and are radially supported by said flow seal grid plate.

9. In a nuclear reactor the combination of a vessel having a bottom head, a plurality of grid support columns removably connected to said head and extending upwardly within said vessel, said columns being hollow perforated tubes, at least one control rod within each of said tubes, means for moving said rods longitudinally, a sectional tubular grid having a bottom portion connected to the upper end of each of said columns, each of said grids having at least one fuel element supporting member on its upper end, a core including a plurality of fuel elements removably supported on said members, each of said fuel elements having a control rod guide tube and coolant flow channels, said control rod being longitudinally movable in said control rod guide tubes, said fuel element coolant flow channel, sectional grid and hollow perforated grid support column tubes defining the primary coolant flow path through said core.

10. The combination of claim 9 wherein said fuel element supporting members are tubes extending upwardly from said grids and said fuel elements have a bottom end fitting removably supported within said tube.

11. The combination of claim 9 wherein said fuel elements comprise a hexagonal shell, a plurality of fissionable-material-containing finned fuel pins supported within said shell and surrounding said control rod guide tube, said hexagonal shells being supported in closely spaced relationship to direct substantially all coolant flow through said shell.

12. The combination of claim 9 including plate means for supporting the upper ends of said columns from lateral displacement.

References Cited by the Examiner

UNITED STATES PATENTS

| | | | |
|---|---|---|---|
| 2,936,273 | 5/60 | Untermyer | 60—108 |
| 2,961,393 | 11/60 | Monson | 176—18 |
| 2,994,657 | 8/61 | Petrick | 176—54 |
| 2,999,059 | 9/61 | Treshow | 176—42 |
| 3,009,869 | 11/61 | Bassett | 176—68 |
| 3,030,291 | 4/62 | Butler et al. | 176—81 |
| 3,060,111 | 10/62 | Sherman | 176—18 |
| 3,103,477 | 9/63 | Mong | 176—41 |

OTHER REFERENCES

McNelly, M. J.: "Organic Heavy-Water Power Reactor," in Peaceful Uses of Atomic Energy (1958), vol. 9, pages 79–87.

CARL D. QUARFORTH, *Primary Examiner.*

OSCAR R. VERTIZ, *Examiner.*